L. B. BERTRAM.

Writing-Pen.

No. 8,242. Reissued May 21, 1878.

Witnesses:
Hugo Bruggemann
Otto Hufeland.

Inventor:
Leopold Beral Bertram
by
Van Santvoord & Hauff
his attorney

N. PETERS, PHOTO-LITHOGRAPHER, WASHINGTON, D. C.

UNITED STATES PATENT OFFICE.

LEOPOLD BERAL BERTRAM, OF NEW WANDSWORTH, ENGLAND.

IMPROVEMENT IN WRITING-PENS.

Specification forming part of Letters Patent No. 184,319, dated November 14, 1876; Reissue No. 8,242, dated May 21, 1878; application filed March 23, 1878; patented in England, September 18, 1874.

*To all whom it may concern:*

Be it known that I, LEOPOLD B. BERTRAM, of New Wandsworth, county of Surrey, England, have invented a new and useful Improvement in Writing-Pens, which invention is fully set forth in the following specification, reference being had to the accompanying drawing, in which—

Figure 1:
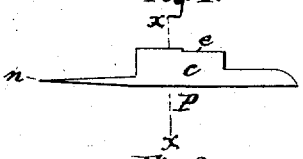
Figure 2:
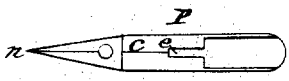
Figure 3:
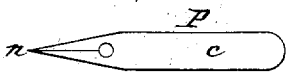
Figure 5:
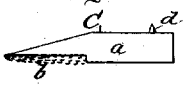
Figure 6:
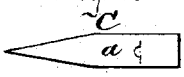
Figure 7:
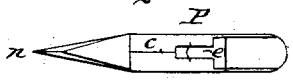
Figure 8:
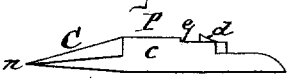
Figure 4:
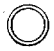

Figure 1 is an elevation of my pen before the writing composition is applied. Fig. 2 is an under-side view of the same. Fig. 3 is a top view. Fig. 4 is a section through the line *x x*, in Fig. 1. Fig. 5 is an elevation, and Fig 6 is a top view, of the cartridge or cylinder in which I place the writing composition. Fig. 7 is an inside view, and Fig. 8 a side elevation, of my pen when ready for use.

Similar letters indicate corresponding parts.

In these figures, P designates my pen, which is formed with a nib, *n*, and with a barrel, *c*, which is intended to receive the solid writing composition. In the inner end of this barrel is formed a slot, *e*, the object of which will be presently explained.

The cartridge C is formed with a cylindrical shell, *a*, provided with a projection, *d*, on its back, and partly cut away at *b*, as shown in Fig. 5. This shell is charged with the solid ink or writing composition of any desired color, by preference aniline, which is soluble in water, and it is then inserted into the barrel *c*, the projection *d* being made to catch in the slot *e*. (See Figs. 7 and 8.)

For using a pen thus constructed it is simply necessary to dip the nib in water, which will dissolve a portion of the solid ink, causing it to run down the nib ready for use.

A pen constructed as above will contain a quantity of solid ink sufficient to last for some time, and when exhausted a fresh cartridge can easily be slipped into the barrel.

I do not wish to limit myself, however, to the precise construction of my pen as above described, the object of my invention being to construct a writing-pen so as to contain a solid writing composition, and that by dipping the nib of the pen in water or other liquid a portion of the composition is dissolved and the nib of the pen is supplied with ink.

What I claim as new, and desire to secure by Letters Patent, is—

The combination with a writing-pen, of a solid writing composition for supplying the nib of the pen with ink, substantially in the manner shown and described.

In testimony that I claim the foregoing I have hereunto set my hand and seal this 21st day of February, 1878.

LEOPOLD BERAL BERTRAM. [L. S.]

Witnesses:

S. H. WAGSTAFF,
21 *Queen Victoria Street, Merchant.*
F. FRUSBY,
8 *Bedford Row, London, Solicitor's Clerk.*